(12) United States Patent
Duerig et al.

(10) Patent No.: US 9,754,609 B2
(45) Date of Patent: *Sep. 5, 2017

(54) METHOD OF PRODUCING A DATA STORAGE MEDIUM

(71) Applicant: International Business Machines Corporation, Armonk, NY (US)

(72) Inventors: Urs T. Duerig, Rueschlikon (CH); Bernd W. Gotsmann, Horgen (CH); Armin W. Knoll, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/840,087

(22) Filed: Aug. 31, 2015

(65) Prior Publication Data

US 2016/0064014 A1    Mar. 3, 2016

Related U.S. Application Data

(63) Continuation of application No. 12/168,275, filed on Sep. 18, 2008, now Pat. No. 9,171,565, which is a
(Continued)

(30) Foreign Application Priority Data

Mar. 31, 2006    (EP) .................................... 06112078

(51) Int. Cl.
*G11B 3/70*        (2006.01)
*B05D 1/28*        (2006.01)
(Continued)

(52) U.S. Cl.
CPC .............. *G11B 3/705* (2013.01); *B05D 1/286* (2013.01); *B29C 33/60* (2013.01); *B29C 43/00* (2013.01);
(Continued)

(58) Field of Classification Search
CPC .................................. G11B 3/705; G11B 3/72
See application file for complete search history.

(56) References Cited

U.S. PATENT DOCUMENTS 6,475,321 B1    11/2002    Ikeda et al.
6,793,209 B1    9/2004    Roberts
(Continued)

FOREIGN PATENT DOCUMENTS

EP        0887794 A1        12/1998
JP       S62214531 A         9/1987
(Continued)

OTHER PUBLICATIONS

Mamin et al., "Thermomechanical writing with an atomic force microscope tip", Appl. Phys. Lett., vol. 61, 1992, p. 1003-1005.*
(Continued)

*Primary Examiner* — Gerard Higgins
(74) *Attorney, Agent, or Firm* — Stosch Sabo

(57) ABSTRACT

The present invention relates a method of producing a data storage medium comprising the steps of: a) coating a layer comprising a polymer material onto at least a part of a template surface thereby to obtain a modified template surface; b) clamping the modified template surface produced in step (a) with a target surface thereby to obtain an assembly; and c) introducing a liquid to an environment of the assembly obtained in step (b) thereby to transfer the layer comprising the polymer material of the modified template surface onto at least an adjacent region on the target surface.

1 Claim, 5 Drawing Sheets

Related U.S. Application Data continuation of application No. PCT/IB2007/051151, filed on Mar. 30, 2007.

(51) Int. Cl.

| | | |
|---|---|---|
| *B29C 43/00* | (2006.01) | |
| *B29C 33/60* | (2006.01) | |
| *B82Y 10/00* | (2011.01) | |
| *G11B 9/14* | (2006.01) | |
| *G11B 11/00* | (2006.01) | |
| *C09D 165/00* | (2006.01) | |
| *G11B 3/72* | (2006.01) | |

(52) U.S. Cl.
CPC ............ *B82Y 10/00* (2013.01); *C09D 165/00* (2013.01); *G11B 3/72* (2013.01); *G11B 9/1472* (2013.01); *G11B 11/002* (2013.01); *G11B 9/149* (2013.01)

(56) References Cited

U.S. PATENT DOCUMENTS

| | | | |
|---|---|---|---|
| 2005/0047307 A1 | 3/2005 | Frommer et al. | |
| 2005/0101688 A1 | 5/2005 | Liao et al. | |

FOREIGN PATENT DOCUMENTS

| | | | |
|---|---|---|---|
| JP | H06251436 A | 9/1994 | |
| JP | 07220311 A | 8/1995 | |
| JP | H07220311 A | 8/1995 | |
| JP | H0975308 A | 3/1997 | |
| JP | 11007666 A | 1/1999 | |
| JP | 2003346392 A | 12/2003 | |
| WO | 9735308 A1 | 9/1997 | |
| WO | 2007113760 A1 | 10/2007 | |

OTHER PUBLICATIONS

Machine translation of detailed description of JP 07-220311 acquired on Dec. 6, 2016.*

Vettiger et al., "The "Millipede"—More than one thousand tips for future AFM data storage", IBM J. Res. Develop. vol. 44, No. 3, May 2000, pp. 323-340.

JP Office Action; Notification of Reasons for Refusal, Application No. 2009-502316. Dec. 21, 2010. Translated Jun. 20, 2016. 6 pages.

A Tracz, et al., "Influence of the crystallization conditions on the morphology of the contact layer of polyethylene crystallized on graphite: Atomic Force microscopy studies," Journal of Applied Polymer Science, vol. 86, 2002, pp. 1329-1336.

A.E. Curzon, et al. , "A simiple technique for removing (111) Cu or Ag single-crystal films form mica and their use in Moire Fringe electron microscope calibration specimens," Journal of Physics, vol. 5, pp. 1046-1048, Jan. 1972.

Chinese Search Report; Date of mailing: Aug. 3, 2010; 4 pages. CN2007800104225.

EPO, Communication Pursuant to Article 94(3) EPC, Application No. 07 735 341.5-1803; Date of Mailing: Jun. 6, 2014, pp. 1-8.

PCT Notification of Transmittal of the International Search Report and Written Opinion; International Application No. PCT/IB2007/051151; International Filing Date: Mar. 30, 2007; Date of Mailing: Aug. 6, 2007; pp. 1-6.

T. Huge, G. Strobl, R. Thomann, "Short Communication: Building Lamellae From Blocks: The Pathway Followed in the Formation of Crystallites of Syndiotactic Polypropylene," Wiley-VCH Verlag GmbH, D-69451 Weinheim, Acta Polym. 1999, 50, pp. 214-217.

* cited by examiner

METHOD OF PRODUCING A DATA STORAGE MEDIUM

FOREIGN AND DOMESTIC PRIORITY

This application is a continuation of U.S. patent application Ser. No. 12/168,275, filed Sep. 18, 2008, which is a continuation application PCT/IB2007051151, filed Mar. 30, 2007, which claims priority to European Patent Application 06112078.8, with European filing date of Mar. 31, 2006, and all the benefits accruing therefrom under 35 U.S.C. §119, the contents of which in its entirety are herein incorporated by reference.

FIELD OF THE INVENTION

The present invention relates to a method of producing a data storage medium.

BACKGROUND ART

A data storage device based on the atomic force microscope (AFM) is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes operate in parallel, with each probe scanning, during operation, an associated field of the storage medium. The storage medium comprises a polymer layer. The tips, which each have a diameter of between 20 nanometers (nm) to 40 nm, are moved across the surface of the polymer layer in a contact mode. The contact mode is achieved by applying forces to the probes so that the tips of the probes can touch the surface of the polymer layer. For this purpose, the probes comprise cantilevers, which carry the tips on their end sections. Bits are represented by indentation marks or non-indentation marks in the polymer layer. The cantilevers respond to these topographic changes while they are moved across the surface of the polymer layer during operation of the device in read/write mode.

Indentation marks are formed on the polymer layer by thermomechanical recording. This is achieved by heating the tip of a respective probe operated in contact mode with respect to the polymer layer. Heating of the tip is achieved via a heater dedicated to the writing/formation of the indentation marks. The polymer layer softens locally where it is contacted by the heated tip. The result is an indentation being produced on the layer that has, for example, a nanoscale diameter comparable to the diameter of the tip used in its formation.

Reading is also accomplished by a thermomechanical concept. The probe is heated using a heater dedicated to the process of reading/sensing the indentation marks. In this case, the probe is heated but not so as to cause heating of its associated tip. That is, the heating temperature is not enough to soften the polymer layer as is necessary for writing. The thermal sensing is based on the fact that the thermal conductance between the probe and the storage medium changes when the probe is moving in an indentation as the heat transport is in this case more efficient. As a consequence of this, the temperature of the cantilever decreases and hence its electrical resistance changes. This change of electrical resistance is then measured and serves as the measuring signal.

Presently, polymer layers for use in storage devices described above are prepared by spin coating a polymer of choice onto a substrate such as, for example, a silicon wafer. The surface roughness of a polymer layer that is produced with this method is on the order of, for example, 1 to 2 nm when measured over a typical bit dimension length scale.

As described above, information is encoded into the polymer layer in the form of indentation marks and non-indentation marks. Taking into account the surface roughness values typically obtained with spin coating, it is desirable to achieve a signal-to-noise ratio (SNR) of >10 dB over the lifetime specification of the storage device for sensing the information. In order to achieve such a sensing margin, each of the indentations should typically be formed with a depth on the order of, for example, 10 nm. Since the lateral dimensions of the indentations are on the same order of magnitude as their depth, it is inevitable that the recording density of the storage device is accordingly limited.

Accordingly, it is desirable to provide a method of producing a data storage medium that, when incorporated in a data storage device, allows for an increased recording density to be attained by such a device compared to a data storage medium produced using previously-proposed methods such as, for example, spin coating.

SUMMARY

According to a first aspect of the present invention, there is provided a method of producing a data storage medium comprising the steps of: a) coating a layer comprising a polymer material onto at least a part of a template surface thereby to obtain a modified template surface; b) clamping the modified template surface produced in step (a) with a target surface thereby to obtain an assembly; and c) introducing a liquid to an environment of the assembly obtained in step (b) thereby to transfer the layer comprising the polymer material of the modified template surface onto at least an adjacent region on the target surface.

According to the first aspect of the present invention, a layer comprising a polymer material is coated onto at least a part of a template surface thereby to obtain a modified template surface (step (a)). The template surface is chosen on account of its surface roughness profile and is preferably relatively defect-free. The modified template surface is clamped to a target surface thereby to obtain an assembly (step (b)). The target surface is, for example, a surface onto which deposition of the layer comprising the polymer material is desired. By introducing a liquid into an environment of the assembly, the layer comprising the polymer material of the modified template surface is transferred onto at least an adjacent region on the target surface (step (c)). The layer comprising the polymer material is transferred onto the target surface in a manner such that its surface that was previously in contact with the template surface is now exposed. The present invention exploits the fact that the surface roughness of the exposed surface of the layer comprising the polymer material is a near replication of the surface roughness of the template surface that it was previously in contact with and from which it is now separated. As discussed earlier, since the template surface is chosen on account of being relatively defect-free, the exposed surface of the layer comprising the polymer material demonstrates the same degree of flatness as the template surface that it was previously in contact with and, advantageously, demonstrates this over an area of several mm².

In the above-described manner, a layer comprising a polymer material may be produced that has reduced surface roughness compared to what is obtainable with spin-coating. Accordingly, indentation marks of <10 nm depth and lateral dimension may be produced without compromising sensing margins and/or requiring sophisticated sensing mechanisms. Due to the possibility of forming indentation marks of reduced dimension on the layer comprising the polymer material, a corresponding improvement in recording density may be obtained in a data storage device incorporating such a layer. A further advantage is that deposition of the layer comprising the polymer material onto a target surface can be done in a manner that does not require complicated processing equipment and/or steps.

By way of example, a typical root mean squared (rms) surface roughness value of a layer comprising a polymer material deposited onto a target surface with the first aspect of the present invention is ≤0.2 nm when measured in a 0.1 □m² area of the target surface whereas that obtained with previously-proposed techniques such as spin-coating is typically 0.5 nm to 1.0 nm when measured on the same scale. The improvement obtained with the first aspect of the present invention over, for example, spin coating is particularly evident from the power spectra of the surface topography of samples produced by the respective methods. Specifically, in the wavelength region of a typical bit distance, i.e. around 20 nm to 50 nm, an improvement of a factor of about 5 is obtained with the first aspect of the present invention over spin coating. This will be discussed in further detail herebelow.

According to an embodiment of the first aspect of the present invention, the template surface has a hydrophilic character. Desirably, the template surface comprises a surface of one of: a mica substrate, a flame-annealed glass substrate, a silicon oxide layer on a silicon substrate and a (100) surface perovskite substrate. It is preferable that the polymer material comprises a cross-linkable polymer. In this case, it is also preferable that heating of the modified template surface is conducted prior to step (b). Desirably, the liquid comprises a polar liquid.

The hydrophilic character of certain materials is exploited in the present invention for the deposition of a polymer layer of reduced surface roughness onto a substrate compared to what is obtained with previously-proposed techniques such as spin-coating. This may be done by using a template surface having a hydrophilic character and a relatively defect-free surface. The layer comprising the polymer material is coated onto the template surface having a hydrophilic character thereby to obtain a modified template surface (step (a)). The modified template surface is then clamped with a target surface onto which deposition of the layer comprising the polymer is desired thereby to obtain an assembly (step (b)). A polar liquid is then introduced into an environment of the assembly. Since the polar liquid is attracted to the template surface by virtue of the latter having a hydrophilic character, it penetrates into the interface between the layer comprising the polymer material and the template surface. The attractive forces between the polar liquid and the hydrophilic template surface cause a disjoining pressure between the layer comprising the polymer material and the template surface, thereby causing them to separate and for the layer comprising the polymer material to be deposited onto a region on the target surface that lay adjacent to the modified template surface in the assembly (step (c)). Since the exposed surface of the layer comprising the polymer material previously lay in contact with the template surface, the surface roughness of the exposed surface is a near replication of that of the template surface. Since the template surface is, in an embodiment of the first aspect, chosen to be relatively defect-free (see discussion above), the exposed surface also exhibits this property and thus has a reduced surface roughness compared to what may be obtained using spin-coating.

By way of example, in an embodiment of the first aspect, the template surface may be chosen to be a surface of a mica substrate. Apart from being hydrophilic, mica is chosen on account of its unique property that, when cleaved, it yields a relatively defect-free surface. A layer comprising a polymer material is coated onto at least a part of a surface of freshly-cleaved mica thereby to obtain a modified mica surface (step (a)). The polymer material may, for example, comprise a cross-linkable polymer such as polystyrene-r-benzocyclobutene random copolymer (PS-BCB). In order to activate cross-linking between the constituents of the PS-BCB, the modified mica surface may, for example, be heated to about 220 degrees centigrade for about 30 minutes. An advantage associated to causing the aforesaid cross-linking reaction to occur is that subsequent annealing and/or immersion in a solvent does not affect the surface profile of a data storage medium produced according to an embodiment of the first aspect. The modified mica surface is then clamped with a target surface onto which deposition of the layer comprising the PS-BCB is desired thereby to obtain an assembly (step (b)). A polar liquid, for example, water is then introduced into an environment of the assembly. Since the water molecules would be attracted to the mica surface by virtue of the latter having a hydrophilic character, it penetrates into the interface between the layer comprising the PS-BCB and the mica surface. This causes the layer comprising the PS-BCB to disjoin from the mica surface and to be deposited onto a region on the target surface that lay adjacent to the modified mica surface in the assembly (step (c)). Since the exposed surface of the layer comprising the PS-BCB previously lay in contact with the mica surface, the surface roughness of the exposed surface of the PS-BCB is a near replication of that of the mica surface. Since the mica surface is, in an embodiment of the first aspect, chosen on account of being relatively defect-free (see discussion above), the exposed surface of the PS-BCB also exhibits this property and, thus, has a reduced surface roughness compared to what may be obtained using spin-coating.

Of course, an embodiment of the first aspect is not restricted to the use of a surface of a mica substrate for the template surface. Indeed, any other surface having a hydrophilic character and the same/similar surface quality as mica can be used. For example, the template surface may comprise a surface of one of: a flame-annealed glass substrate, a silicon oxide layer on a silicon substrate, and a (100) surface perovskite substrate. Also, an embodiment of the first aspect is not limited to the use of PS-BCB as the polymer material. Indeed, any other suitable cross-linkable polymer may be used.

According to another embodiment of the first aspect, the template surface may comprise a surface of a sacrificial layer provided on a support. Preferably, the sacrificial layer comprises one of a layer of: a water-soluble salt, silicon oxide, and a metal and organic material. When the sacrificial layer comprises the silicon oxide layer, the liquid preferably comprises hydrofluoric acid.

The sacrificial layer can be chosen so as to further facilitate ease of transfer of the layer comprising the polymer material onto the target surface. The layer comprising the polymer material is coated onto at least a part of the sacrificial layer (step (a)). The sacrificial layer so modified is then brought into contact and clamped with a target surface thereby to obtain an assembly (step (b)). In order to facilitate the transfer of the layer comprising the polymer material from the modified sacrificial layer onto a region of the target surface that lay adjacent to the modified sacrificial layer in the assembly, the layer is dissolved by introducing an appropriately chosen liquid.

In one embodiment, the sacrificial layer is a layer of a water-soluble salt such as, for example, sodium chloride, potassium chloride, or the like.

In another embodiment, the sacrificial layer comprises a silicon oxide layer on a silicon substrate. In this case, removal of the silicon oxide layer may be facilitated by using a liquid comprising hydrofluoric acid, which effectively etches the silicon oxide layer.

In yet another embodiment, the sacrificial layer comprises a metal layer, in which case, the liquid may comprise, for example, a suitable acidic etchant.

In still another embodiment, the sacrificial layer comprises an organic material that has the property of forming a layer of ordered orientation i.e. a highly ordered thin-film. The organic material may, for example, be a material comprising self-ordering alkyl molecules, self-ordering block copolymers, or the like. The organic material may also be a material capable of forming a liquid crystal layer. Where the sacrificial layer comprises an organic material, the liquid may be a solvent suitable for use with and capable of dissolving organic materials.

The present invention also extends to a data storage medium produced according to an embodiment of the method aspect of the present invention and to a data storage device incorporating such a data storage medium. Features of one aspect of the present invention may be applied to any another aspect and vice versa.

BRIEF DESCRIPTION OF THE DRAWINGS

Reference will now be made, by way of example, to the accompanying drawings in which.

DETAILED DESCRIPTION

Figure 1A:
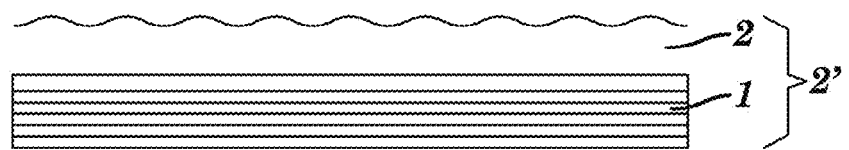
FIG. 1A, FIG. 1B, FIG. 1C and FIG. 1D, illustrate the steps in an embodiment of the present invention.

Within the description, the same reference numerals or signs are used to denote the same parts or the like.

Figure 1B:
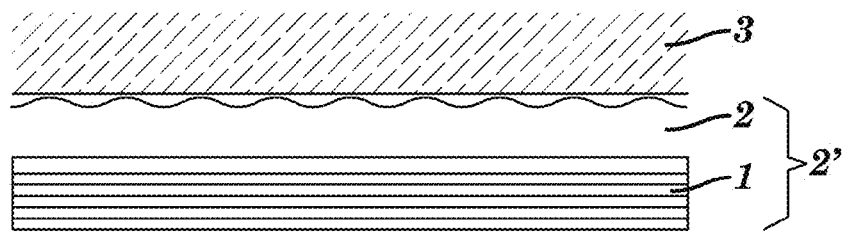
Figure 1C:
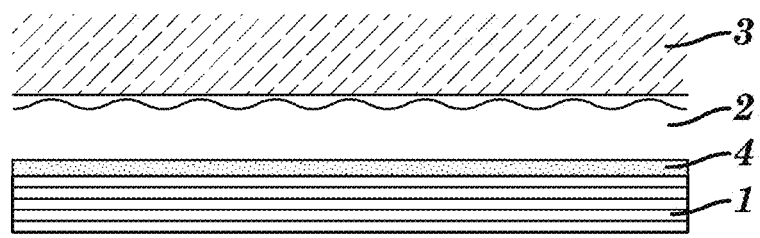
Figure 1D:
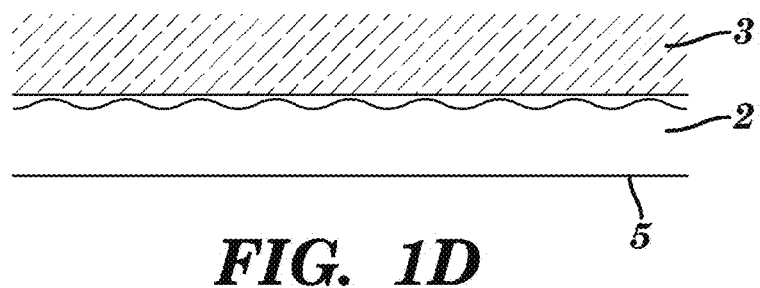

Reference is now made to FIG. 1A. FIG. 1B, FIG. 1C and FIG. 1D, which illustrate the steps in an embodiment of the present invention.

As shown in FIG. 1A, a layer 2 comprising a polymer material is coated onto at least a part of a template surface 1 thereby to obtain a modified template surface 2'. In an embodiment of the present invention, the modified template surface is a combination of the template surface 1 and the layer 2 comprising the polymer material coated thereon.

As shown in FIG. 1B the modified template surface 2' is is brought into contact and clamped with a target surface 3 thereby to obtain an assembly. The target surface 3 may, for example, be a surface onto which deposition of the layer 2 comprising the polymer material is desired.

As shown in FIG. 1C, the layer 2 comprising the polymer material of the modified template surface 2' is transferred onto at least an adjacent region on the target surface 3 by introducing a liquid 4 to an environment of the assembly. In an embodiment of the present invention, the layer 2 comprising the polymer material may be transferred onto a region on the target surface 3 that lay directly adjacent to the modified template surface 2'. The layer 2 comprising the polymer material may be transferred onto the whole of the target surface 3 or a part thereof (for example, lying adjacent to the region of the target surface 3 onto which the layer 2 comprising the polymer material was transferred by, for example, heating the target surface 3.

By way of example, the polymer material is polystyrene-r-benzocyclobutene random copolymer (PS-BCB), which is a cross-linkable polymer, has a hydrophobic character, and is not hygroscopic. The template surface 1 is a surface of freshly-cleaved mica. Mica is chosen on account of having a hydrophilic character and its unique property that, when cleaved, it yields a relatively defect-free surface. A layer 2 of PS-BCB is coated onto the mica surface 1 by spin-coating thereby to obtain a modified mica surface 2'. Typically, the spin-coating is done by dropping a solution of the PS-BCB onto the mica surface 1 and then spinning the mica surface 1 at a speed of about 2000 revolutions/minute. In this way, the layer 2 of the PS-BCB is coated onto the mica surface 1 at a thickness of about 100 nm. Of course, the PS-BCB can be deposited at a desired thickness onto the mica surface 1 by varying the weight of the PS-BCB in the solution thereof. After spin-coating the layer 2 of the PS-BCB onto the mica surface 1, the modified mica surface 2' that is obtained is heated at 220 degrees centigrade for about 30 minutes. This is done to activate the cross-linking reaction of the constituents in the PS-BCB.

The modified mica surface 2' produced is brought into contact and clamped with a target surface 3 thereby to obtain an assembly. The target surface 3 may, for example, be a surface of a silicon substrate. The clamping may be done by any clamping method and/or device suitable to the application of an embodiment of the present invention (for example, for the individual or mass scale production of a data storage medium).

A polar liquid 4 such as, for example, water, is introduced into an environment of the assembly. Typically, this is done by immersing the assembly in water. Water molecules penetrate the interface between the layer 2 comprising PS-BCB and the mica surface 1 on account of being attracted to the hydrophilic mica surface 1. The attractive forces between the water molecules and the mica surface 1 result in a disjoining pressure to be exerted between the layer 2 comprising the PS-BCB and the mica surface 1, causing them to separate spontaneously. The separation of these surfaces is further aided by the hydrophobic character of the PS-BCB, which repels the water molecules. In this way, the layer 2 comprising the PS-BCB of the modified mica surface 2' is transferred onto at least an adjacent region on the silicon substrate 3. The mica surface 1 is then lifted off and the layer 2 comprising the PS-BCB transferred onto the silicon substrate is blown dry by using nitrogen gas.

As can be seen from FIG. 1D, the layer 2 comprising the PS-BCB is transferred onto the silicon substrate 3 in a manner such that its surface that was previously in contact with the mica surface 1 is now exposed. The present invention exploits the fact that the surface roughness of the exposed surface 5 of the layer 2 comprising the PS-BCB is a near replication of the surface roughness of the mica surface 1 that it was previously in contact with and that it has now been separated from. Since freshly cleaved mica has the property that it is relatively defect-free, the exposed surface 5 of the layer 2 comprising the PS-BCB demonstrates the same degree of flatness as the mica surface 1 that it was previously in contact and, advantageously, demonstrates this over an area of several mm$^2$.

The present invention allows deposition of a layer 2 comprising a polymer material onto a target surface 3 in a manner that does not require complicated processing equipment and/or steps. In the above example, which was given to demonstrate the principle underlying the present invention, transfer of the layer 2 of PS-BCB onto the silicon substrate 3 was done by exploiting the surface forces acting between water 4 and, respectively, the hydrophilic mica surface 1 and the hydrophobic PS-BCB in the layer 2.

Figures 2A, 2B:
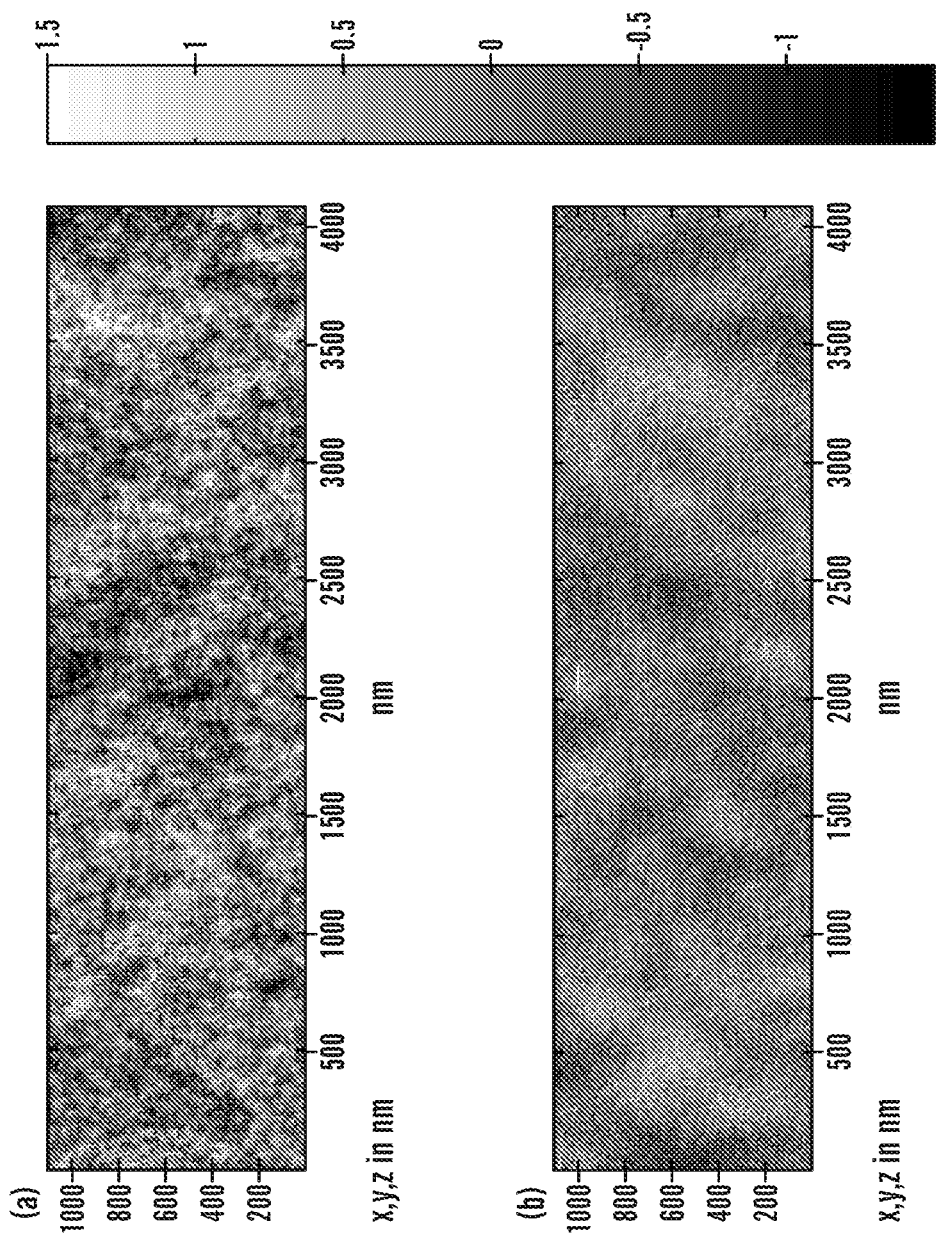
FIG. 2A and FIG. 2B show AFM images of a layer of PS-BCB deposited on a silicon substrate by spin-coating (FIG. 2A and an embodiment of the present invention FIG. 2B)

As discussed earlier, the rms surface roughness values of a layer 2 comprising a polymer material deposited onto a target surface 3 in the above manner is approximately 0.2 nm when measured in a 0.1 m$^2$ area of the target surface 3 whereas that obtained with previously-proposed techniques such as spin-coating is typically 0.5 nm to 1 nm when measured on the same scale. The improvement in surface roughness values that may be obtained with an embodiment of the present invention over spin-coating is demonstrated in FIGS. 2A and 2B, which show AFM images of a layer 2 comprising PS-BCB deposited on a mica surface 1 by spin-coating (FIG. 2A) and the present invention (FIG. 2B). The change in surface topography is illustrated by the variation in the gray-scale of these images. By comparing, it is evident that the variation in surface topography and, therefore, the surface roughness of the layer 2 comprising PS-BCB prepared using an embodiment of the present invention is less than that obtained with spin-coating.

Figure 3:
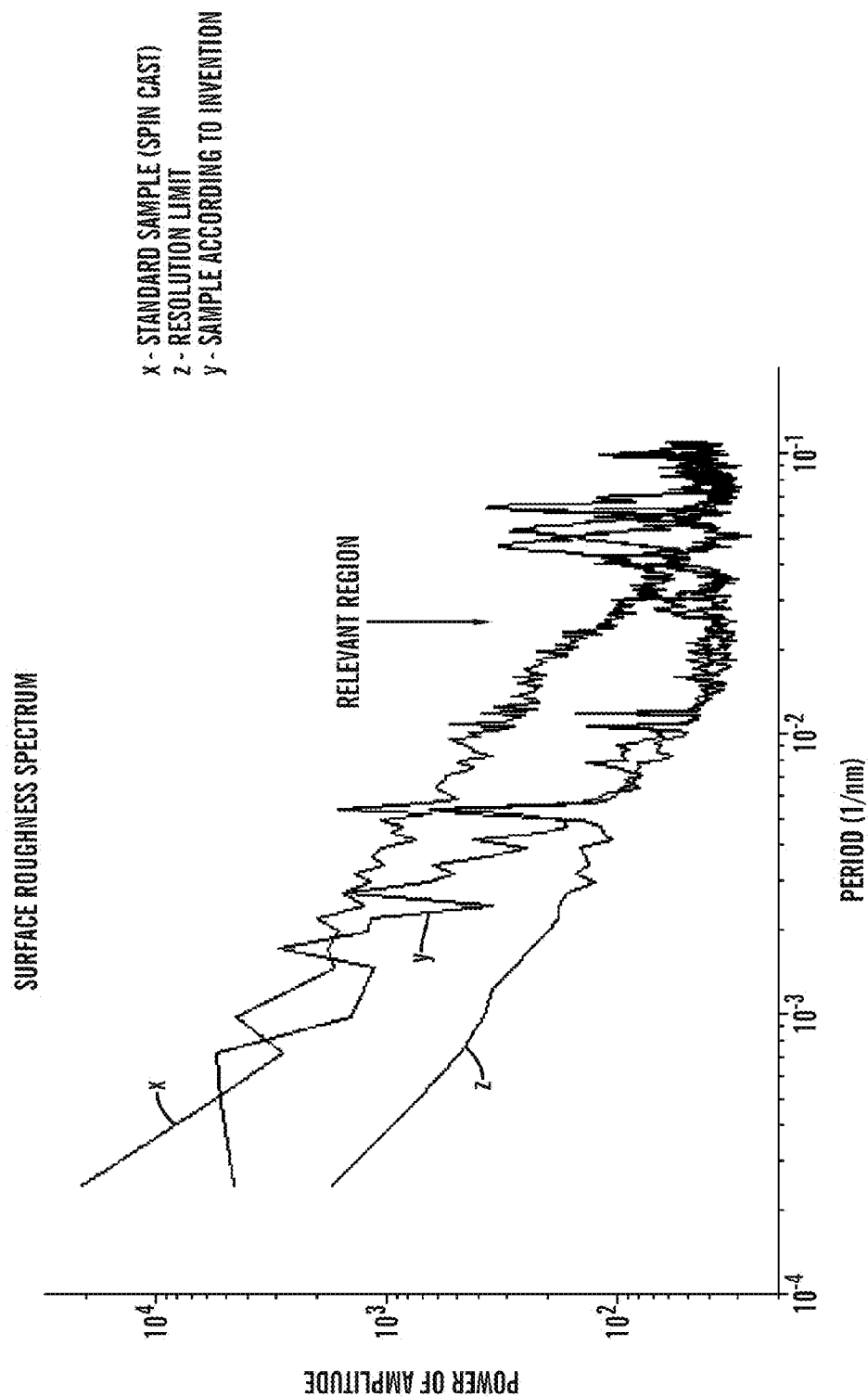
FIG. 3 shows the power spectra of the samples of FIG. 2A and FIG. 2B.

In order to draw a quantitative comparison between the layers shown in FIGS. 2A and 2B, reference is made to FIG. 3 that shows the power spectra of their surface topographies. In this regard, the spectrum of the spin-coated sample of FIG. 2A is denoted by "x", the sample prepared in accordance with an embodiment of the present invention is denoted by "y", and the electronic noise of the detection mechanism is denoted by "z" in FIG. 3.

From FIG. 3, it can be seen that the amplitude of the power spectrum of the layer 2 comprising PS-BCB deposited on the mica surface 1 using an embodiment of the present invention (curve y) is up to one order of magnitude lower than that obtained by spin-coating (curve x). This translates to a threefold reduction of the indentation depths in the layer 2 comprising PS-BCB deposited on the mica surface 1 prepared using an embodiment of the present invention over that prepared by using spin-coating but which, despite being shallower, are capable of being detected with a comparable SNR as that employed for the layer 2 comprising PS-BCB prepared by spin-coating. Due to the reduced surface roughness of the layer 2 comprising PS-BCB prepared using an embodiment of the present invention as compared to spin-coating, shallower indentation marks can be formed on this layer without compromising on sensing margins and/or requiring complicated sensing equipment. Since the lateral dimensions of the indentation marks scale with their depth, the number of indentation marks that are formed may be increased for a layer 2 comprising PS-BCB that is produced using an embodiment of the present invention over spin-coating, which results in an increased recording density capability.

The improvement that may be obtained with an embodiment of the present invention over, for example, spin coating is particularly evident from the amplitude of the power in the frequency region of a typical bit distance. Specifically, at around 0.02/nm (denoted by an arrow labeled "relevant region" in FIG. 3), the amplitude of the power spectrum associated to layer 2 comprising PS-BCB deposited on a mica surface 1 using an embodiment of the present invention is around 180 whereas that obtained with spin-coating is around 36 (these units being in accordance with FIG. 3). Additionally the latter signal is limited by electronic noise of the detection system, which is denoted by the curve 'z'. Thus, an improvement of a factor of at least 5 is obtained with an embodiment of the present invention over spin coating in the wavelength region of a bit distance that is typical in data storage media.

Figure 4:
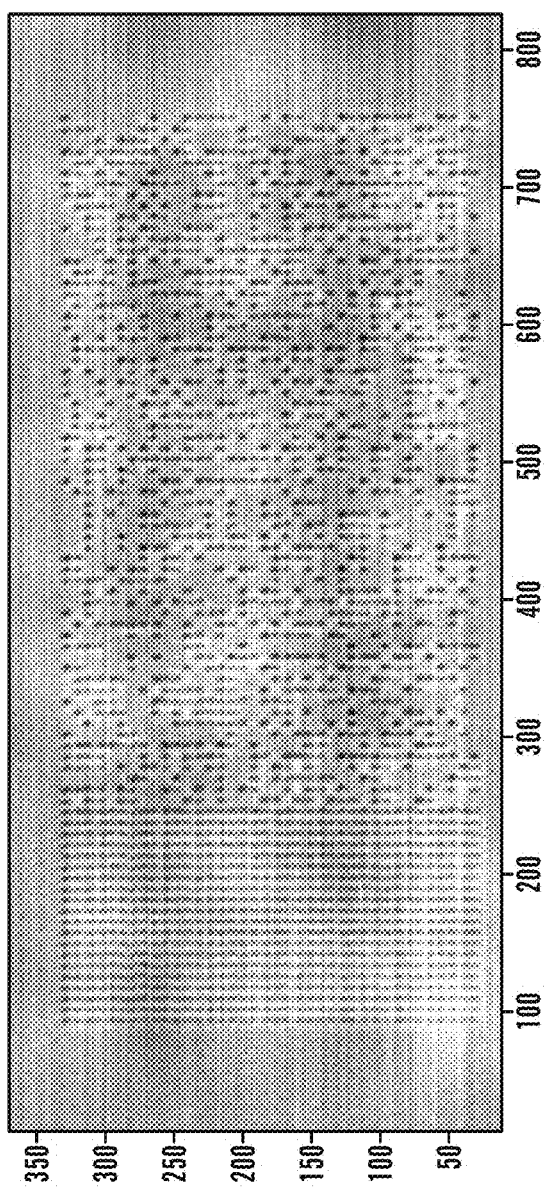
FIG. 4 shows a data storage medium prepared in accordance with an embodiment of the present invention.

FIG. 4 shows a data storage medium prepared in accordance with an embodiment of the present invention. The x- and y-axes denote the number of recorded pixels. The pixel to pixel distance is, in this case, about 4 nm. The indentations were written with a pitch of about 24 nm, which translates to a storage density of 1.4 Terabit/square inch for a d=1 code, i.e. where there is at least one non-indentation mark ("0") between indentation marks ("1") in a data track. The depths of the indentations is about 2 nm and the overall SNR is about 8 dB, which is sufficient for obtaining a raw bit error rate of less than $10^4$, i.e. on average and without employing a correcting mechanism, one error is obtained for 10,000 bits. It is expected that the SNR is mostly limited by electronic noise of a system used in sensing the indentations. Advantageously, the reduced depth of the indentations results in reduction in rim formation around the indentations, which typically interferes with and distorts the sensing of indentations.

For the template surface 1, the present invention is not limited to the use of mica. Indeed, other substrates that are hydrophilic and have the same/similar surface quality as mica can be used. For example, a surface of a flame-annealed glass substrate, a silicon oxide layer on a silicon substrate, or a (100) surface perovskite may be used, these being preferable for implementing the present invention in an environment for the mass production of data storage media. In the case of a (100) surface perovskite, this may be represented by $ABO_3$ where the element A is a lanthanide alkaline earth metal, B is a transition metal, and O is oxygen. A specific example of the (100) surface perovskite is strontium titanate.

Figure 5A:
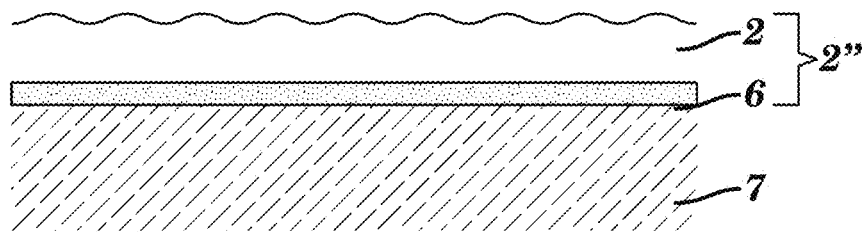
FIG. 5A, FIG. 5B and FIG. 5C illustrate the steps in another embodiment of the present invention.
Figure 5B:
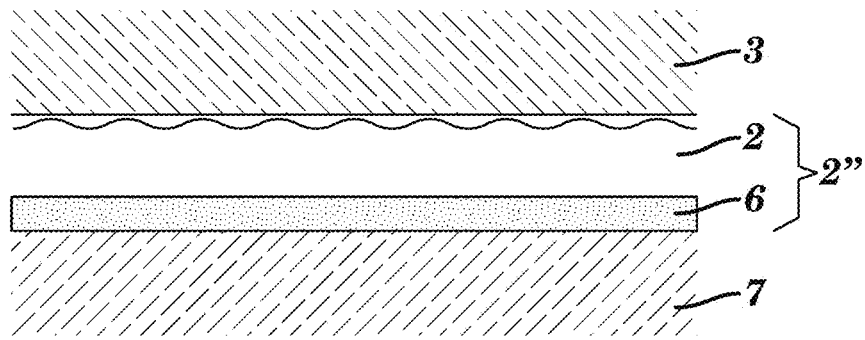
Figure 5C:
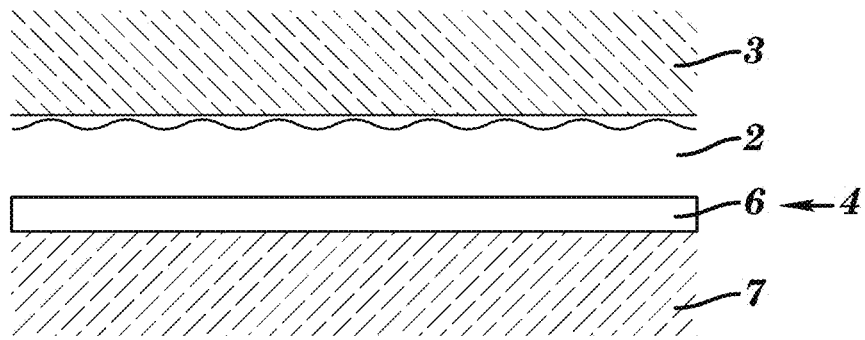

Alternatively, the template surface 1 may comprise a sacrificial layer on a support. Referring to FIG. 5A, the layer 2 comprising the polymer material is coated onto at least a part of the sacrificial layer 6 provided on a support 7 thereby to obtain a modified sacrificial layer 2". In this case, the modified sacrificial layer 2" is taken to be a combination of the layer 2 comprising polymer material and the sacrificial layer 6 onto which it is coated. From FIG. 5B, it can be seen that) the modified sacrificial layer 2" is then brought into contact and clamped with a target surface 3 to obtain an assembly. As shown in FIG. 5C, in order to facilitate the transfer of the layer 2 comprising the polymer material from the modified sacrificial layer 2" onto a region of the target surface 3 that lay adjacent to the modified sacrificial layer 2" in the assembly, the sacrificial layer 6 is dissolved by the introduction of a liquid 4 suitable for this purpose.

The support 7 may comprise, for example, a Si(111), Si(110), Si(100), Ge(100) crystal surface or the like, this being done on account of the profile of such crystal surfaces.

In one embodiment, the sacrificial layer 6 may be a layer of a water-soluble salt, such as, for example, sodium chloride, potassium chloride, or the like. In an alternative embodiment, the sacrificial layer 6 may comprise a silicon oxide layer on a silicon substrate 7. In this case, removal of the silicon oxide layer 6 in step (c) may be facilitated by using a liquid 4 comprising hydrofluoric acid, which effectively etches the silicon oxide layer 6. In yet another embodiment, the sacrificial layer 6 may comprise a metal layer, in which case, the liquid 4 may comprise, for example, a suitable acidic etchant. In still another embodiment, the sacrificial layer 6 may comprise an organic material that has the property of forming a layer of ordered orientation i.e. a highly ordered thin-film. The organic material may be, for example, a material comprising self-ordering alkyl molecules, self-ordering block copolymers, or the like. The organic material may also be a material capable of forming a liquid crystal layer. Where the sacrificial layer 6 comprises an organic material, the liquid 4 may be a solvent suitable for use with and capable of dissolving organic materials.

In an embodiment of the present invention, the polymer material may have a hydrophobic character (in which case, it is preferable that it is also hygroscopic) or a hydrophilic character.

The template surface 1 and the target surface 3 may be chosen so that their respective surface energy is such that the molecules of the liquid introduced in step (c) is attracted with preference to the template surface 1 rather than the target surface 3. By way of example, the target surface 3 should be chosen so as to exhibit weaker hydrophilicity than the template surface 1 or to have a hydrophobic character. Specifically, when the target surface 3 and the polymer material both have a hydrophobic character, transfer of the layer 2 of polymer material onto the target surface 3 is aided. The target surface 3 and the layer 2 comprising the polymer material, due to their hydrophobic nature, serve to repel molecules of the polar liquid 4 in combination. This causes the exertion of a stronger disjoining pressure by the polar liquid 4 (that causes the separation of the layer 2 comprising the polymer material from the hydrophilic template surface 1) than if the target surface 3 did not have a hydrophobic character. Furthermore, firmer adhesion of the layer 2 comprising the polymer material onto the target surface 3 is facilitated by the Van der Waals forces acting between these hydrophobic surfaces. The target surface is, for example, a silicon substrate, a hydrogen-passivated surface thereof, or a polymer layer coated on a substrate having a hydrophobic character.

An embodiment of the present invention is not limited to data storage applications and may, for example, be used in any other scanning probe applications such as, for example, high-resolution lithography, bio-assays, and the like.

The present invention has been described above purely by way of example and modifications of detail can be made within the scope of the invention.

Each feature disclosed in the description, and (where appropriate) the claims and drawings may be provided independently or in any appropriate combination.

The invention claimed is:

1. A method for producing a data storage medium comprising:
   (a) coating a polymer material directly onto at least a part of a template surface so as to form a polymer layer, wherein the polymer layer and the template surface form a modified template surface, wherein the polymer material comprises a polystyrene-r-benzocyclobutene random copolymer and wherein the polymer layer comprises a thickness of 100 nm, wherein the polymer layer of the data storage medium has a root mean square (RMS) surface roughness of less than 0.2 nm when measured in a 0.1 m² target area;
   (b) clamping the modified template surface produced in step (a) with a target surface so as to form an assembly; and
   (c) introducing a liquid to an environment of the assembly formed in step (b) so as to cause the polymer layer to separate from the template and remain on at least an adjacent region of the target surface;
      wherein the data storage medium comprises indentation marks having a pitch of 24 nm and a depth of 2 nm such that the data storage medium has a storage density of 1.4 Terabit/square inch and an overall signal-to-noise ratio (SNR) of 8 dB, wherein the data storage medium comprises a pixel to pixel distance of 4 nm, and wherein the data storage medium exhibits an amplitude of the power spectrum of 180 at a period of 0.02/nm.

* * * * *